United States Patent [19]

Andoh et al.

[11] Patent Number: 5,995,660
[45] Date of Patent: *Nov. 30, 1999

[54] IMAGE PROCESSING APPARATUS

[75] Inventors: Akihiro Andoh; Shunichi Kimura; Shinji Shishido; Yutaka Koshi, all of Nakai-machi, Japan

[73] Assignee: Fuji Xerox Co., Ltd, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/890,424

[22] Filed: Jul. 9, 1997

[30] Foreign Application Priority Data

Aug. 28, 1996 [JP] Japan .................................. 8-245633

[51] Int. Cl.$^6$ .............................. G06K 9/00; G06K 9/62; G06K 9/68
[52] U.S. Cl. ........................ 382/181; 382/209; 382/220; 382/221; 382/318
[58] Field of Search .................................. 382/181, 209, 382/220, 221, 318

[56] References Cited

U.S. PATENT DOCUMENTS

| | | | |
|---|---|---|---|
| 5,058,189 | 10/1991 | Kanno | 382/318 |
| 5,255,331 | 10/1993 | Kelly | 382/220 |
| 5,719,967 | 2/1998 | Sekine | 382/269 |
| 5,742,703 | 4/1998 | Lin et al. | 382/209 |
| 5,815,605 | 9/1998 | Koike | 382/269 |

FOREIGN PATENT DOCUMENTS

| | | |
|---|---|---|
| 4-10765 | 1/1992 | Japan . |
| 5-308529 | 11/1993 | Japan . |

OTHER PUBLICATIONS

"International Standard of Multimedia Encoding", Maruzen books, pp. 18–43 (1991). (non–English).

*Primary Examiner*—Phuoc Tran
*Assistant Examiner*—Daniel G. Mariam
*Attorney, Agent, or Firm*—Oliff & Berridge, PLC

[57] ABSTRACT

The present invention has an object to determine whether image data is generated by data processing such as PDL, or optically captured scan-in image, for each area.

To achieve the object, a determining table is provided for distribution patterns of pixels having substantially the same pixel value for image data area composed of plural pixels. Then a reference area designating unit designates a reference area by selecting from input image data the pixel of interest having a pixel value and the reference pixels surrounding thereof. A same pixel value distribution generating unit compares the pixel value of the pixel of interest with the pixel values of the reference pixels in the reference area to generate a distribution pattern of the pixel having substantially the same pixel value. Next, a determining unit compares the generated distribution pattern with the distribution patterns held in the determining table to determine the reference area to be the image data generated by data processing.

4 Claims, 13 Drawing Sheets

LINE PATTERN GROUP

EDGE PATTERN GROUP

SOLID PATTERN GROUP

REPEATED PATTERN GROUP

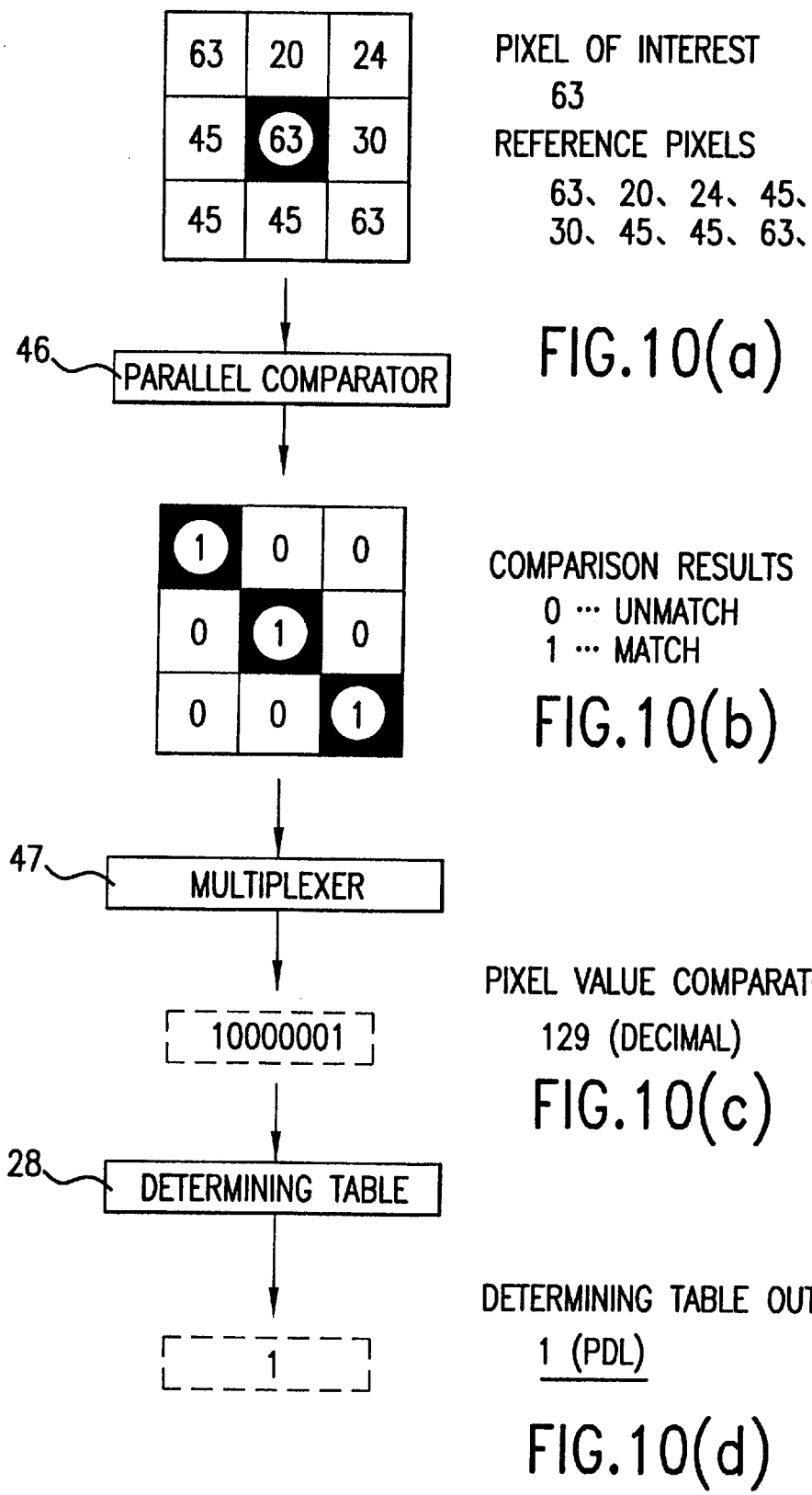

| 0 | 0 | 0 |
|---|---|---|
| 1 | 1 | 1 |
| 0 | 0 | 0 |

LINE COMPARISON

0 ··· UNMATCH
1 ··· MATCH

DETERMINING TABLE
OUTPUT

1 −(PDL)

FIG. 11(a)

| 0 | 0 | 1 |
|---|---|---|
| 0 | 1 | 1 |
| 0 | 0 | 1 |

EDGE COMPARISON

0 ··· UNMATCH
1 ··· MATCH

DETERMINING TABLE
OUTPUT 1 (PDL)

FIG. 11(b)

| 0 | 0 | 0 |
|---|---|---|
| 0 | 1 | 0 |
| 0 | 0 | 0 |

| 0 | 0 | 0 |
|---|---|---|
| 0 | 1 | 0 |
| 1 | 0 | 0 |

NON-PDL COMPARISON

0 ··· UNMATCH
1 ··· MATCH

DETERMINING TABLE
OUTPUT 0 (SCAN-IN)

FIG. 11(c)

PDL IMAGE     CHARACTER OUTLINE EXTRACTION RESULT

IMAGE PROCESSING APPARATUS

BACKGROUND OF THE INVENTION

1. Field of the Invention

The present invention relates to an image processing apparatus which determines whether an input data is image data generated by data processing such as PDL image data, or optically scanned scan-in image data, more specifically to an apparatus which perform such determination for each of respective regions in an image data to allow such processing as encoding and decoding of image data containing both of the image partitions.

2. Discussion of the Related Art

In order to reduce an amount of data, image encoding has been carried out for images containing computer generated (CG) image created for DTP (desktop publishing), or data of character image or drawing image described by a page description language (PDL), which is referred to as PDL image data hereinbelow, and image data digitally converted from a hard copy by means of a scanner (hereinafter, scan-in image). For instance, image data of size of A4, resolution of 400 dpi (dot per inch), 256 levels of gradation by 4 colors may require a storage capacity of approximately 64 MB, whereas encoding allows a significant reduction of storage capacity or of transmission time.

For such image encoding scheme, one of irreversible general encoding methods of colored multi-value image data is JPEG-DCT method, described in "International Standard of Multimedia Encoding", pp. 18–43, Maruzen books.

JPEG-DCT method which is irreversible encoding method may achieve some better encoding efficiency for scan-in image data, while degradation of image quality may be occurred for PDL image data. JPEG-Spatial method which is reversible encoding method may not result in degraded quality of PDL image data, but compression ratio of scan-in image data will be less.

In order to overcome the problem of discrepancy, encoding methods have been studied which combines irreversible encoding scheme such as JPEG-DCT method and reversible encoding scheme such as JPEG-Spatial method.

In general, an encoding method combining reversible and irreversible encoding methods performs appropriate encoding for input image data by separating it into three types of data of: scan-in image data; PDL image data; and TAG data which is a bitmap switching between scan-in image data and PDL image data.

An exemplary image processing apparatus of the prior art is presented in FIG. 14, which performs an encoding scheme as described above.

In FIG. 14, reference numeral 101 designates to input image data, 102 to a separator circuit for separating input image data into scan-in image data, PDL image data, and TAG data, 103 to scan-in image data, 104 to PDL image data, 105 to TAG data, 106 to an encoder for encoding scan-in image data with a predetermined method, 107 to an encoder for encoding PDL image data with a predetermined method, 108 to an encoder for encoding TAG data with a predetermined method, 109 to encoded scan-in image data, 110 to encoded PDL image data, and 111 to encoded TAG data.

More specifically, input image data 101 is entered into the separator 102 which in turn separates it into scan-in image data 103, PDL image data 104, TAG data 105 which contains switching information between the scan-in image data portion and the PDL image data portion.

The scan-in image data 103 is encoded by the scan-in image encoder 106 with an irreversible encoding method such as JPEG-DCT, to output encoded scan-in image data 109. The PDL image data 104 is encoded by the PDL image data encoder 107 with a reversible encoding method such as JPEG-Spatial to output encoded PDL image data 110. Also, TAG data 105 is encoded by the TAG encoder 108 to output TAG encoded data 111.

As can be seen from the description above, scan-in image portion and PDL image portion within an input image is separated for each pixel by the TAG information in order to appropriately encode independently with an most effective encoding scheme.

More specific exemplary image processing apparatus as described above has been described in Japanese Published Unexamined Patent Application No. Hei 5-308529 (1993), which will be described below with reference to accompanying FIG. 15.

In FIG. 15, reference numeral 120 designates to input image data, 121 to a block forming circuit, 122 to a one-block-delay circuit, 123 to a histogram calculator, 124 to an extracted color determining circuit, 125 to a bitmap data encoder, 126 to a color data encoder, and 127 to a natural image data encoder.

In this image processing apparatus, input image data 120 is partitioned into 8 by 8 pixel blocks through the block forming circuit 121. For these block data, while the one-block-delay circuit 122 delays by one block, the histogram calculator 123 calculates a histogram of the pixel value in the input block data to transmit to the extracted color determining circuit 124 image data of maximum frequency of histogram. In the extracted color determining circuit 124, the input image information is compared with pixel data inputted pixel by pixel in which frequency of the histogram becomes maximum, if a match occurs then the pixel is encoded as "1", if not the pixel is encoded as "0" for transmitting to the bitmap data encoder 125. The bitmap data encoder 125 encodes such bitmap data to output TAG code data 131.

The density data computed in the histogram calculator 123 is also transmitted to the color data encoder 126 to be reversible encoded therein to be output as PDL image code data 130.

Furthermore, input image data grouped in blocks is transmitted to the natural image data encoder 127 to be irreversibly encoded to be output as scan-in image code data 129.

It should be appreciated that, in addition to the extraction of the PDL image data portion in the input image data by means of a histogram, there are known technologies extracting characters as technologies of digital copying machines for rendering high quality image. For example, a method described in the Japanese Published Unexamined Patent Application No. Hei 4-10765 (1992), separating an image into areas including characters and areas not including characters for providing high quality printing images, an area being determined as characters are treated such as edge enhancement and high resolution printing (400 dpi) in order to obtain high quality results.

In this method of the prior art, the process is performed by determining the distribution of density value for each respective pixel of image data and extracting areas where density value is abruptly changing as outline of characters.

However, the former method of the prior art of Japanese Published Unexamined Patent Application No. Hei 5-308529 has problems enumerated as (1) through (3) as described below, while the latter of Japanese Published Unexamined Patent Application No. Hei 4-10765 has problem as described below as (4):

(1) As the pixel having maximum frequency of the histogram is extracted, PDL image data comprised of plural color components may not be extracted.

For example, in the method above, only one line may be extracted for a PDL image data, even if there were plural lines of different colors. In addition, as shown in FIG. 17, part of image where density value of each of pixels is changing gradually as a gray scale, PDL image data cannot be extracted.

(2) Block distortion may often occur because the process is preceded by grouping of image data into blocks.

For example, as shown in FIG. 18, assuming that there are blocks A to D for determining the area in the image data, each block has 8 by 8 pixels, and that the shaded part shown in the figure is PDL image data. Then block C and block B have not enough number of pixels in the shaded area so that the shaded area may be determined to be PDL image data. However, in block A, the shaded area contains only one pixel, so that the area will be determined as a part of scan-in image data.

As a consequence, only pixels in the block A in the scan-in image data portion are irreversibly encoded. This results in that only one pixel in the PDL image of the shaded area which is a continuous drawing, and that apparently prompt degradation of image quality may be obtained.

(3) The large computation is required for determining the maximum frequency.

The worst case may require the number of computation of the determination of the equality of up to 2016 times, and the number of computation of the comparison of up to 63 times. This may cause the load of the process to be increased, as well as the processing time to be augmented.

(4) Extracted portion and PDL image area do not match because of extraction of the outline of character image.

For example, as shown in FIG. 19, an outline is extracted from character image. Since there exists areas inside a character which are not yet extracted, the encoding efficiency of the reversible encoding may be decreased when considering the entire image of that character. Also, outline is not extracted for the area of gradually changing as shown in FIG. 17, so that it will not be extracted as PDL image.

SUMMARY OF THE INVENTION

The present invention has been made in view of the foregoing circumstances, and has an object to provide an image processing apparatus which, without determining by means of histograms or by means of grouping of image data into blocks, may determine whether image data is that generated by the data processing such as PDL, or scan-in image captured optically for each of areas in the image data.

Another object of the present invention is to provide an image processing apparatus which may perform appropriate image processing, such as encoding, by identifying image data as have been described above, in accordance with the characteristics of that image data.

The present invention has been made in the view point that, in the image data created by data processing such as PDL image data, there are pixels having the same (substantially the same) pixel value within areas in the image data when comparing to the scan-in image data scanned optically. Based on this point of view, image data created by data processing and scan-in image data scanned optically are distinguished.

In other words, according to the image processing apparatus of the present invention, a reference area is designated by selecting within input image data a pixel of interest having a pixel value and reference pixels surrounding thereof, to determine whether or not there may exist a reference pixel which has pixel value substantially the same with the pixel of interest in this reference area. Thereafter, in case in which there exists reference pixel having pixel value substantially the same with the pixel of interest, the reference area data is determined to be image data generated by data processing, whereas in case in which there exists no reference pixel having pixel value substantially the same with the pixel of interest in the reference area is determined to be scan-in image data.

In accordance with the present invention, by detecting fundamental drawing elements (distribution of pixel pattern) in the image data generated by data processing, such as edges, lines, solids, gradations, repeated patterns, and so on, the image data generated by data processing is distinguished from the scan-in image data.

In accordance with the image processing apparatus of the present invention, the distribution pattern of pixels having substantially the same pixel value is prepared in advance for image data area which includes of plural pixels. Then, a reference area is designated by selecting a pixel of interest having a pixel value and reference pixels surrounding thereof, and distribution pattern is generated for pixels having substantially the same pixel value by comparing the pixel value of the pixel of interest with the pixel values of the surrounding reference pixels within the reference area. Thereafter by comparing the generated distribution pattern and the distribution pattern held in a table, the reference area is determined to be of image data generated by data processing if both patterns are matched.

As can be seen, in the image processing apparatus according to the present invention, even if identification information (for example, such as TAG data) cannot be received independently with pixel data, the PDL data is distinguished accurately from the scan-in data. In addition PDL image data may be encoded by means of a reversible encoding process, while scan-in image data may be encoded by means of an irreversible encoding process, so as to ensure the image quality and the compression efficiency.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIGS. 10(a)–(d) show schematic diagrams of identification process between PDL image data and scan-in image data;

FIGS. 11(a)–(c) show schematic diagrams of identification process between PDL image data and scan-in image data;

DETAILED DESCRIPTION OF THE PREFERRED EMBODIMENT

Figure 1:
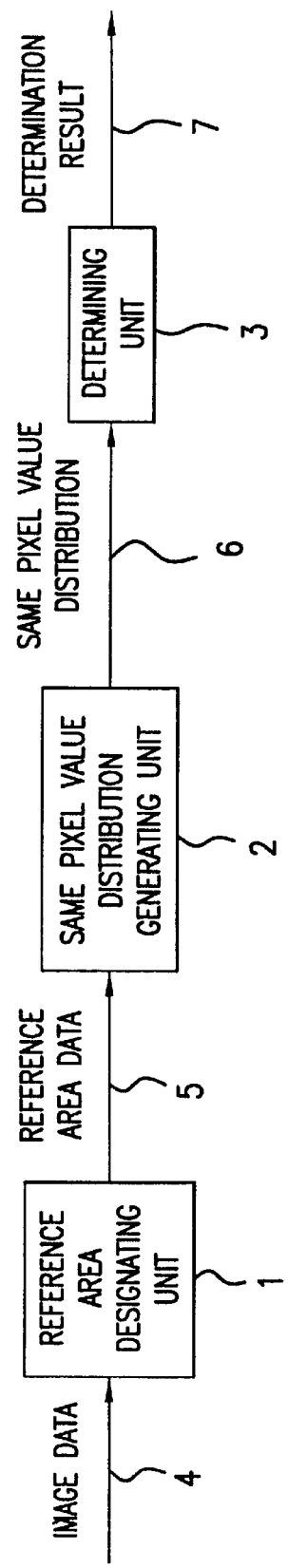
FIG. 1 shows an overview of an image processing apparatus according to the present invention.

FIG. 1 shows the overview of an image processing apparatus according to the present invention.

The image processing apparatus comprises, for example: a reference area designating unit 1 for gathering from image data 4 successively input one pixel by one pixel in the order of raster scan an pixel data of interest having a pixel value and plural reference pixel data residing around thereof to output as reference area data 5, a same pixel value distribution generating unit 2 for detecting how reference pixels having the same pixel value around the pixel of interest are distributed based on the reference area data 5 to output as pixel value distribution 6, a determining unit 3 for determining fundamental drawing elements such as edges, lines, solids, gradations, and repeated patterns, based on the pixel value distribution 6, to either determine that the reference area is PDL pixel data if these fundamental drawing elements have been detected, or to determine that the reference area is scan-in data if not detected in order to output determination results 7.

Figure 2:
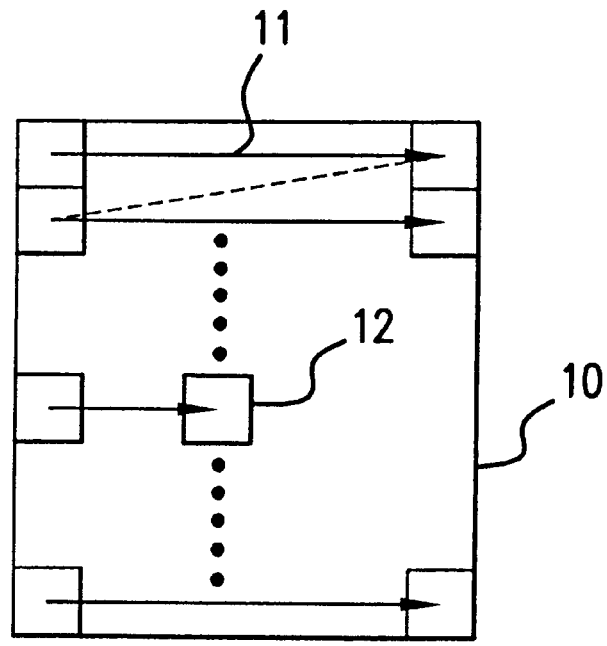
FIG. 2 shows a conceptual schematic diagram describing image data.
Figure 3:
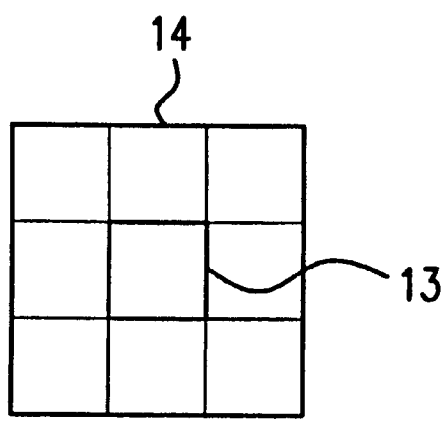
FIG. 3 shows a conceptual schematic diagram describing reference areas.

The image data 4 is a flow of pixel data 12 scanned in the order as shown by an arrow 11 in one page of image data 10 as shown in FIG. 2, for each of pixel values to be input to the reference area designating unit 1 one by one. The reference area designating unit 1 gathers pixel value of the pixel of interest 13 and the pixel values of surrounding reference pixels (for example, surrounding eight pixels) around the pixel of interest to be determined 13 from the image data 4 as shown in FIG. 3, to group them into a group of nine pixel values 14 to output as reference area data 5. The same pixel value distribution generating unit 2 calculates from the reference area data 5 to see whether the pixel value of the pixel of interest 13 and the pixel value of reference pixels are the same, to output by gathering the computation results as pixel value distribution 6. The embodiment as shown in FIG. 4 assigns '1' to the reference pixel having the same pixel value with the pixel of interest, and '0' to other reference pixels to output as pixel value distribution 6 by gathering assigned pixels.

Figures 4, 5, 6:
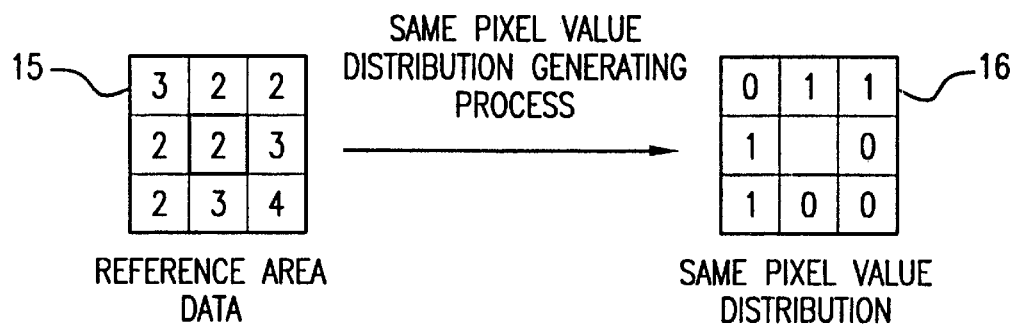
FIG. 4 shows a conceptual schematic diagram describing replacement to the pattern of pixel distribution.
FIG. 5 shows a conceptual schematic diagram describing the pattern of pixel distribution of fundamental drawing elements.
FIG. 6 shows a conceptual schematic diagram describing the pattern of pixel distribution of fundamental drawing elements.

The determining unit 3 provides in advance as shown in FIG. 5 patterns of the same pixel values of the fundamental drawing elements. If these patterns match to the pixel value distribution 5 then the matched reference area is determined to be PDL image data, while if not match then the unmatched reference area is determined to be scan-in image data. The embodiment shown in FIG. 5 provides patterns of lines, edges, and solids for the fundamental drawing elements.

At this point the gradation, which is one of fundamental drawing elements frequently used in PDL, may be considered to be a line, when locally observing, in which pixels of the same pixel value are aligned in a predetermined direction. Thus, in the embodiment shown in FIG. 5, if there is a matched pattern in a group of the patterns of lines, the data is determined to be as PDL image pixel data irrespective to whether the corresponding pixel to be determined is a line or a gradation. There also is the repeated pattern as a fundamental drawing element. For example, dot pattern of any size of dot punctuated at a given interval, or any geometric textures corresponds thereto. These repeated patterns are, when locally viewing part, often composed of any of edge, line, or solid pattern. However since there may be cases in which no pixel of the same pixel value exists therearound if the repetition frequency is very short such that it does not match with the patterns shown in FIG. 5, the patterns as shown in FIG. 6 may be provided which are expansion of surrounding reference areas, for example.

First Embodiment

An embodiment of the image processing apparatus according to the present invention will be described hereinbelow with reference to the accompanying drawings.

Figure 7:
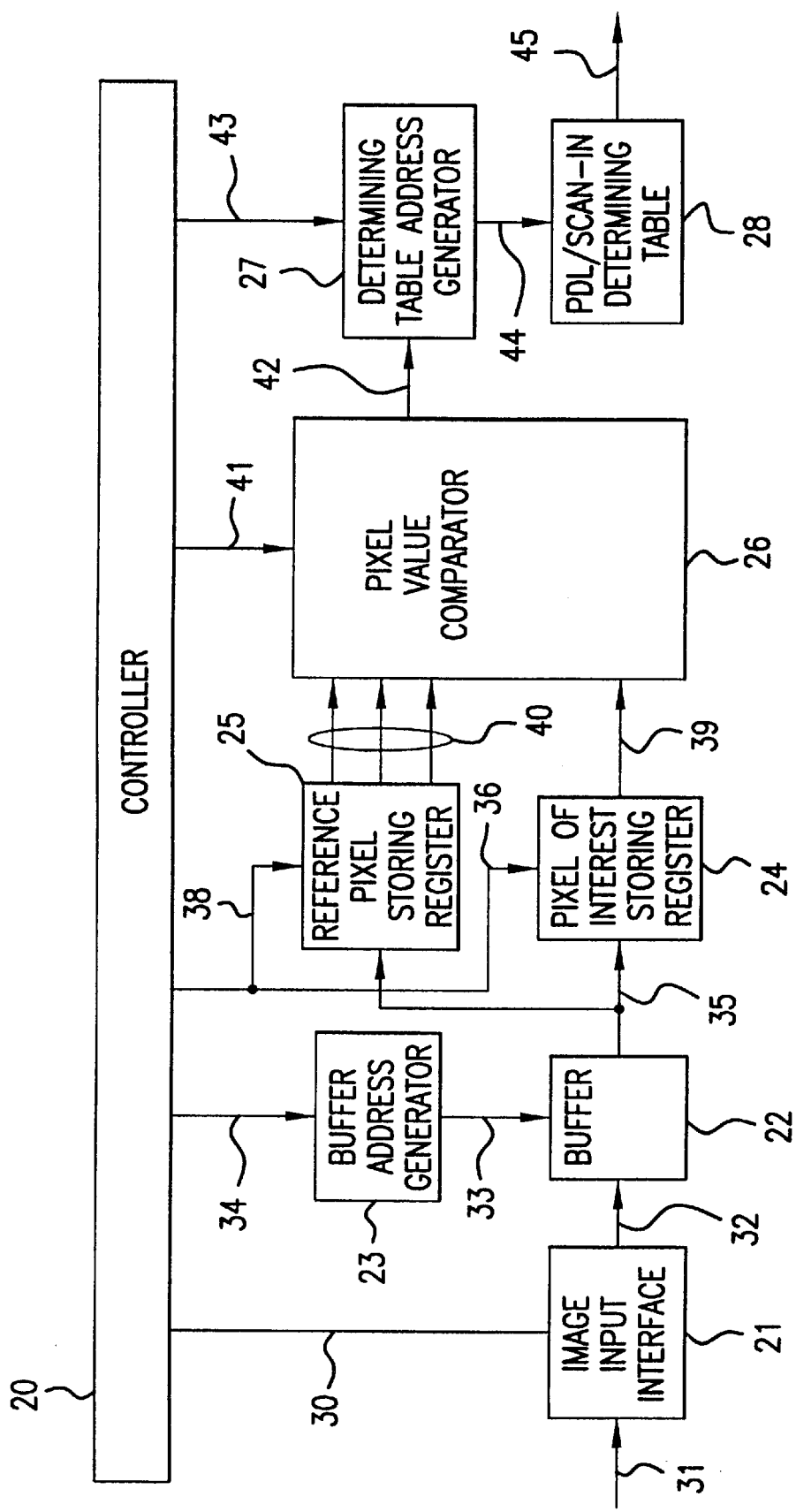
FIG. 7 shows a schematic diagram of an image processing apparatus according to an embodiment of the present invention.

FIG. 7 shows the arrangement of the image processing apparatus according to the present invention. The image processing apparatus comprises: a controller 20 for controlling the entire image processing apparatus; an image input interface 21 for inputting image data from outside; a buffer 22 for temporarily storing input image data; a buffer address generator 23 for specifying pixels of the image data stored in the buffer 22; a pixel of interest storing register 24 for temporarily storing the pixel of interest; a reference pixel storing register 25 for temporarily storing reference pixels; a pixel value comparator 26 for comparing the pixel value of the pixel of interest with that of the reference pixels; a determining table address generator 27 for generating reference addresses referencing PDL/scan-in determining table 28 based on the resultant comparison of the pixel values; and a PDL/scan-in determining table 28 describing a table for determining whether it is a PDL image data or scan-in image data.

In FIG. 7, reference numeral 30 designates to an input signal line for checking to see by the controller 20 whether or not image data is input from the image input interface 21 to the buffer 22, 31 to another input signal line for the image processing apparatus to input image data from outside, 32 to still another input signal line for the buffer 22 to receive image data, 33 to another input signal line for buffer 22 to receive addresses of the buffer memory from the buffer address generator 23, 34 to another input signal line for the buffer address generator 23 to receive buffer address generating instruction from the controller 20, 35 to another input signal line for pixel of interest storing register 24 to receive pixel value of the pixel of interest, 36 to another input signal line for pixel of interest storing register 24 to receive output instruction of the pixel value of pixel of interest from the controller 20, 37 to another input signal line for reference pixel storing register 25 to receive reference pixel values, and 38 to another input signal line for reference pixel storing register 25 to receive output instruction of reference pixel values from the controller 20.

In addition, reference numeral 39 in FIG. 7 designates to an input signal line for pixel value comparator 26 to receive the pixel value of pixel of interest, 40 to another input signal line for pixel value comparator 26 to receive reference pixel values, 41 to another input signal line for pixel value comparator 26 to receive comparison instruction of the pixel value of pixel of interest with the pixel value of reference pixels, 42 to another input signal line for decision table address generator 27 to receive comparison results of the pixel values, 43 to another input signal line for decision table address generator 27 to receive decision table address generating instruction from the controller 20, 44 to another input signal line for PDL/scan-in determining table 28 to receive addresses in the table from the determining table address generator 27, 45 to an output signal line for PDL/scan-in determining table 28 to output the results of determination whether the reference area including the pixel of interest is part of PDL image data or is part of scan-in image data.

Figure 8:
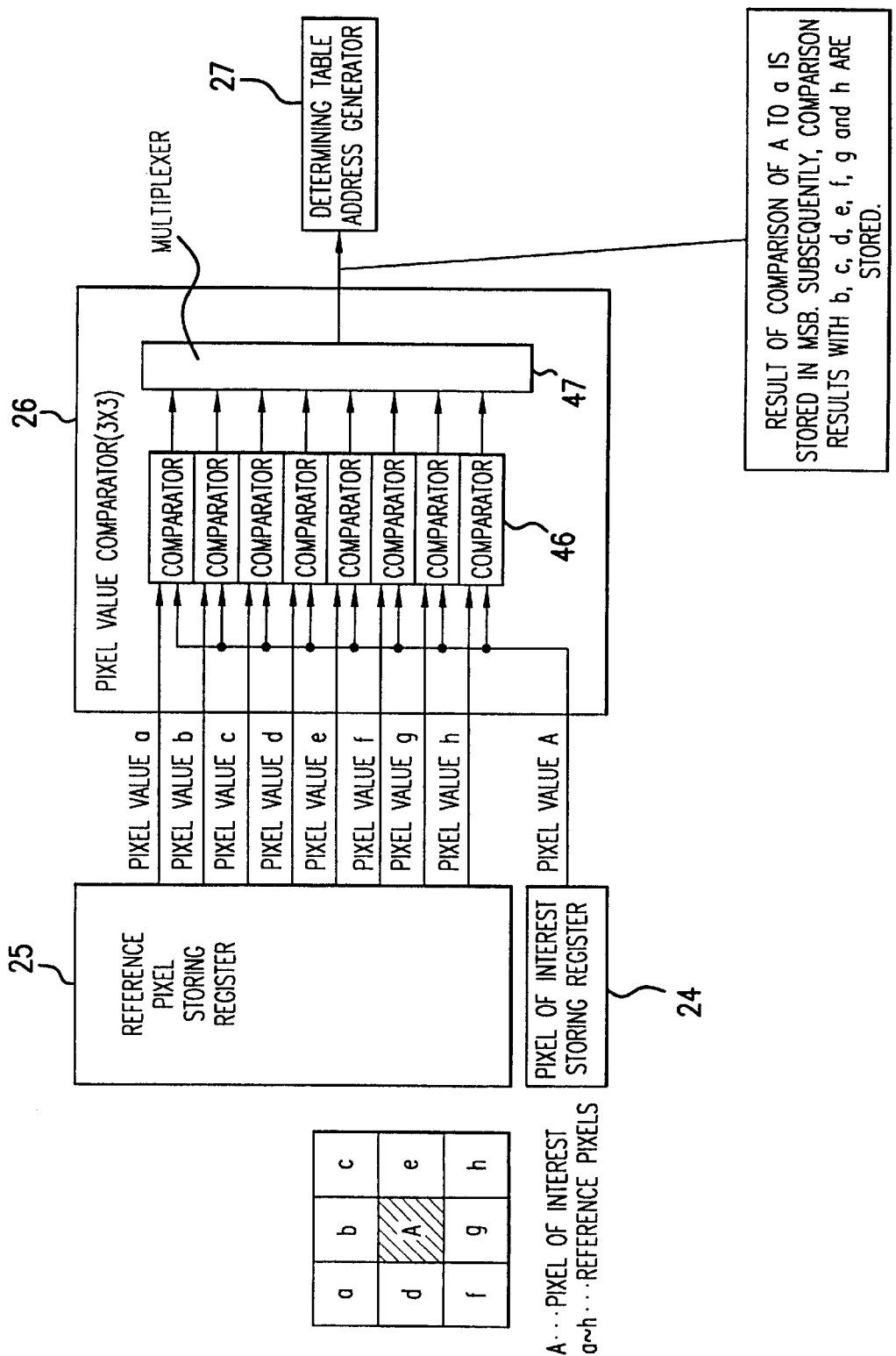
FIG. 8 shows a schematic diagram of a pixel value comparator according to the embodiment of the present invention.

As shown in FIG. 8, the pixel value comparator 26 performs in parallel comparisons of the pixel value of pixel of interest A from the pixel of interest storing register 24 with the pixel values of eight reference pixels a–h from the reference pixel storing register 25, and has eight comparators 46 for performing these comparisons. In this embodiment these comparators 46 output '1' when comparison matched, and '0' when comparison unmatched.

Also, the pixel value comparator 26 comprises a multiplexer 47 for multiplexing inputs from respective parallel comparators 46 into one value. The eight results of comparisons are output as a stream of bits such that the MSB contains the result of comparison of the pixel value of pixel of interest A with the pixel value of the reference pixel a, and that the LSB contains the result of comparison of the pixel value of pixel of interest A with the pixel value of the reference pixel h.

In addition, the PDL/scan-in determining table 28 is provided in a ROM in this embodiment, in which a table for determining whether the data is PDL image data or scan-in image data is written in advance.

This determining table has input of addresses ranging from 0 to 255 and output of one bit data corresponding to an input address. In this embodiment output data may be scan-in image data if '1', and may be PDL image data if '0'. That is, this address corresponds to the bit stream output from the multiplexer 47, such that a determining table outputs the determination result '1' when a bit stream "10000001" (129 in decimal) is provided.

Next, the process in the image processing apparatus of the arrangement as described above will be described.

When image data is input from outside the apparatus via the line 31, the image input interface 21 transfers the image data to the buffer 22 via line 32. In this embodiment we assume that the data transfer is performed line by line basis, and flow control and exclusive control are not considered.

Each time data for one line has been transferred, the image input interface 21 notifies the completion of data transfer to the controller 20. The controller 20, when notified, begins PDL/scan-in determination control for that one line. In other words, the controller 20 outputs instruction of sequentially outputting addresses of pixel of interest and reference pixels via input signal line 34. In this embodiment the pixel of interest is sequentially selected from the leftmost to the rightmost within a line, and the reference pixels are eight pixels adjoining the pixel of interest. Since the topmost and bottommost lines lack reference pixels, appropriate default value or a copy of each line is used instead.

Then the controller 20 sequentially operates the buffer address generator 23, followed by the pixel of interest storing register 24, reference pixel storing register 25, pixel value comparator 26, determining table address generator 27, and PDL/scan-in determining table 28.

The buffer address generator 23 generates addresses for the pixel of interest and the reference pixels in the buffer 22, and the addresses are output to the buffer 22 via line 33.

The buffer 22 outputs specified address data via lines 35 and 37. More specifically, the pixel of interest is output via line 35 to the pixel of interest storing register 24, and the reference pixels is output via line 37 to the reference pixel storing register 25. As the size of the buffer 22 is determined by the number of reference pixels, and in this embodiment 3 by 3 pixels being referred to, the buffer 22 may be a buffer for three scan lines. However it should be noted that when data input from the image input interface 21 and data output of the pixel of interest and reference pixels are performed in parallel, a buffer of the size of more than four lines may be needed.

The pixel of interest storing register 24 stores the value of pixel of interest, and receives output instruction of the pixel of interest from the controller 20 via line 36 to output the value of pixel of interest immediately to the pixel value comparator 26 via line 39.

The reference pixel storing register 25 stores the value of reference pixels, and receives output instruction of the reference pixels from the controller 20 via line 38 to output the value of reference pixels immediately to the pixel value comparator 26 via line 40. Here, the size of the reference pixel storing register 25 may be determined by the number of reference pixels and since this embodiment uses 3 by 3 pixel reference, a register of the capacity of eight pixels (9 pixels minus one pixel of interest) will suffice.

The pixel value comparator 26 receives comparison instruction of the pixel values from the controller 20 via line 41 to immediately compares pixel values of the pixel of interest with that of reference pixels to output the results of comparison to the determining table address generator 27 via line 42. The comparison of the pixel values is performed in parallel with the pixel of interest A and the reference pixels a to h. In this embodiment these values are compared in parallel but serial comparison may be performed as well.

Next, the pixel value comparator 26 gathers by means of the multiplexer all of the results of comparisons into a stream of bits to output to the determining table address generator 27. The determining table address generator 27 receives address generation instruction from the controller 20 via line 43 to immediately generate an address for the PDL/scan-in determining table based on the results of comparisons, to output that address to the PDL/scan-in determining table 28 via line 44. Then the PDL/scan-in determining table 28 outputs the data corresponding to the input address to outside via output line 45.

The distinguishing process between PDL image data and scan-in image data by means of the parallel comparators 46, multiplexer 47, and PDL/scan-in determining table 28 will be described below in greater details with reference to FIGS. 10(a)–(d).

Figure 9:
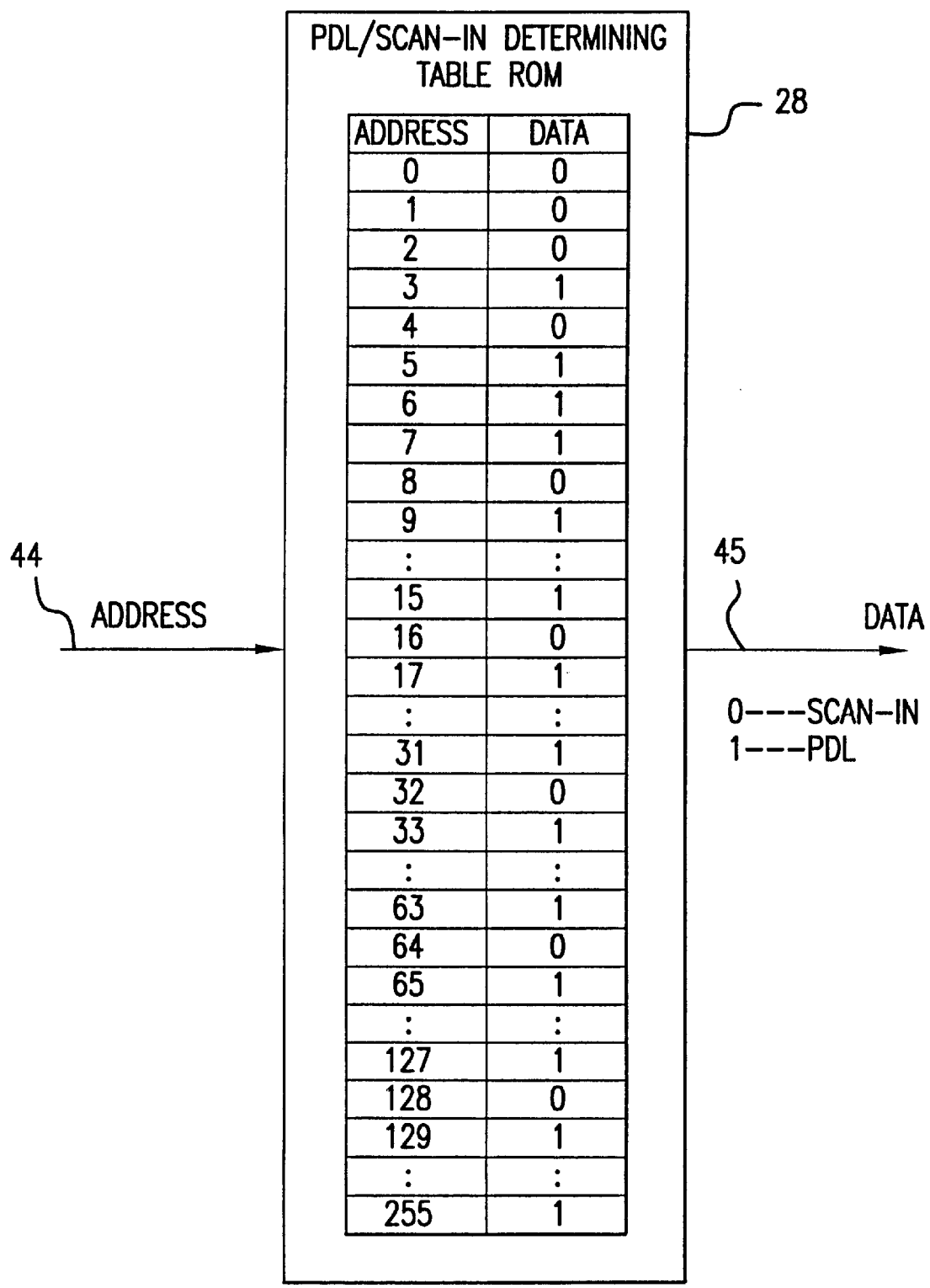
FIG. 9 shows a schematic diagram of a decision table according to the embodiment of the present invention.

When the pixel of interest and the reference pixels both included in a reference area at a given moment of time is as shown in FIG. 10(a), the comparators 46 replaces with '1' reference pixels having pixel value '63' which is the same with the pixel of interest, and with '0' the reference pixels having different pixel value so as to generate a distribution patterns as shown in FIG. 10(b). The multiplexer 47 gathers the distribution patterns into a stream of bits to be output as "10000001" as shown in FIG. 10(c). This bit stream may be written as '129' in decimal notation, and the determination results '1' as shown in FIG. 10(d) (that is, the determination results for PDL image data) is output based on the contents of the PDL/scan-in determining table 28 as shown in FIG. 9 at the address '129'.

The reference area may be identified to a variety of patterns of PDL image data, as shown in FIGS. 11(a)–(c), depending upon the prepared patterns of pixel distribution.

For example, The distribution pattern as shown in FIG. 11(a) indicates pixel distribution pattern in a line in the horizontal direction, wherein it is determined as PDL image data since the resulting output from the PDL/scan-in determining table 28 is '1' in this type of distribution pattern. The distribution pattern as shown in FIG. 11(b) is a pattern of pixel distribution at an edge, wherein it is determined to be PDL image data since the resulting output from the PDL/scan-in determining table 28 is '1' in this type of distribution pattern.

The distribution pattern as shown in FIG. 11(c) is a pattern of pixel distribution at non-PDL image data area, which may be determined to be scan-in image data since the resulting output from the PDL/scan-in determining table 28 is '0' in this type of distribution pattern.

FIGS. 12(a), 12(b), 13(a) and 13(b) show examples applied to actual image data.

Figure 12A:
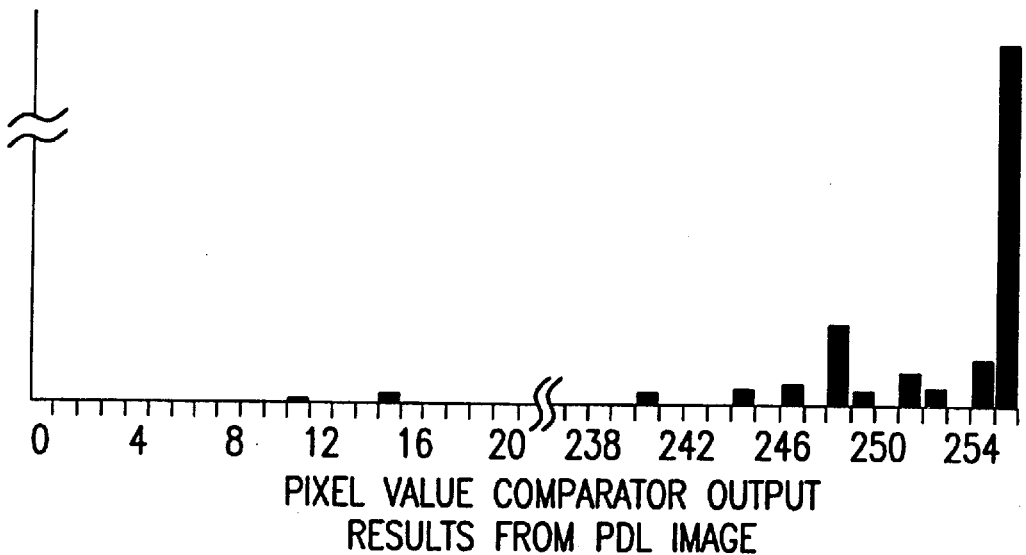
FIGS. 12(a) and 12(b) show graphs indicating the results of comparison of the value of pixel of interest and the value of reference pixels between the PDL image data and the scan-in image data according to the present invention.
Figure 12B:
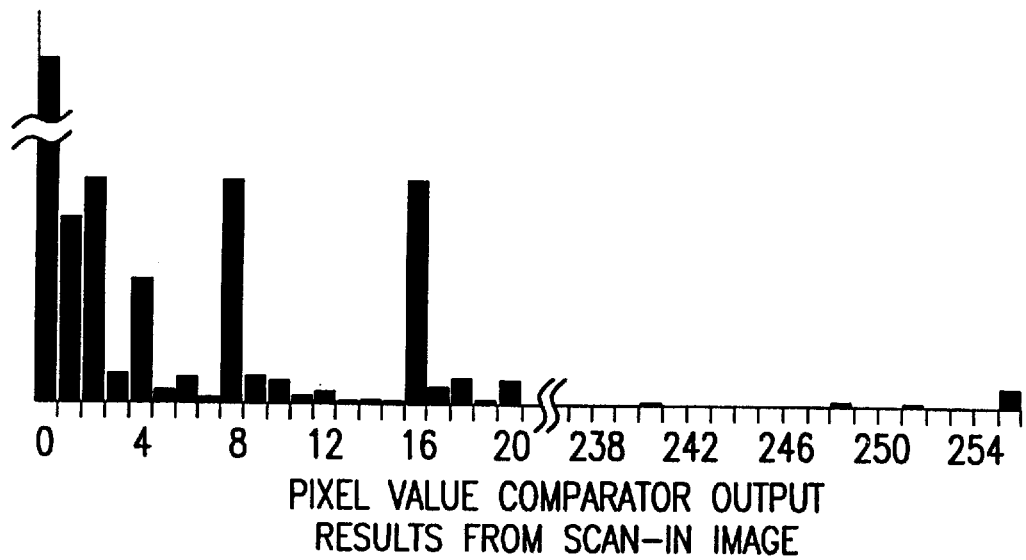

FIGS. 12(a) and 12(b) are results of application to PDL image data and to scan-in image data, respectively. The horizontal axis indicates output value of the pixel value comparator 26, and the vertical axis indicates frequency. In PDL image data, frequency increases when the value of pixel of interest matches to greater number of values of reference pixels. Contrary, it should be noted that the value of pixel of interest does not match to most of values of reference pixels in case of scan-in image data.

Figure 13A:
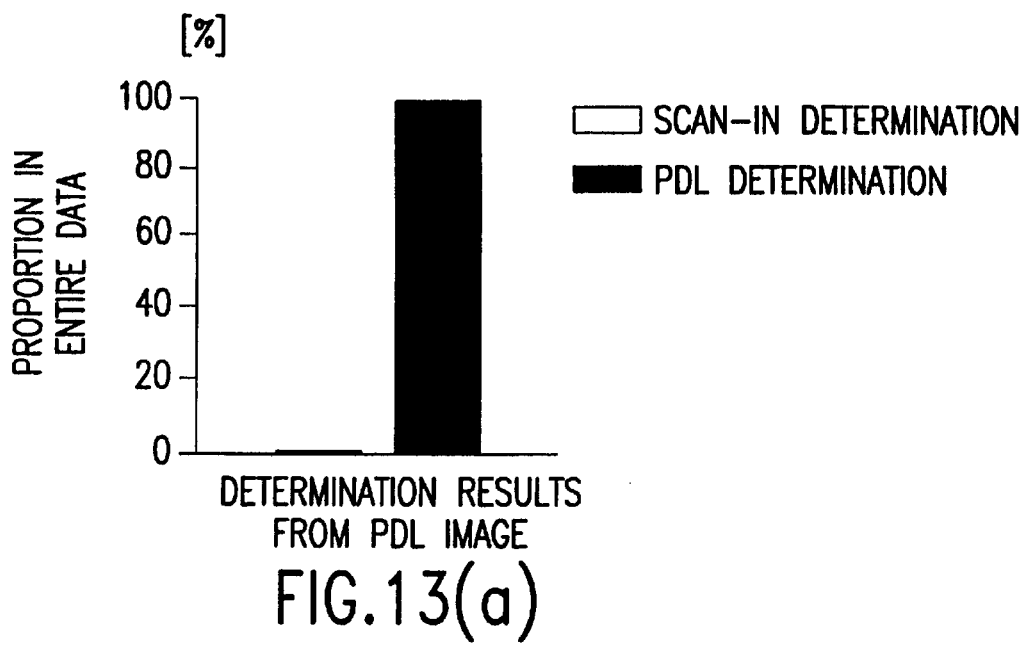
FIGS. 13(a) and 13(b) show graphs indicating the results of determination between the PDL image data and the scan-in image data according to the present invention.
Figure 13B:
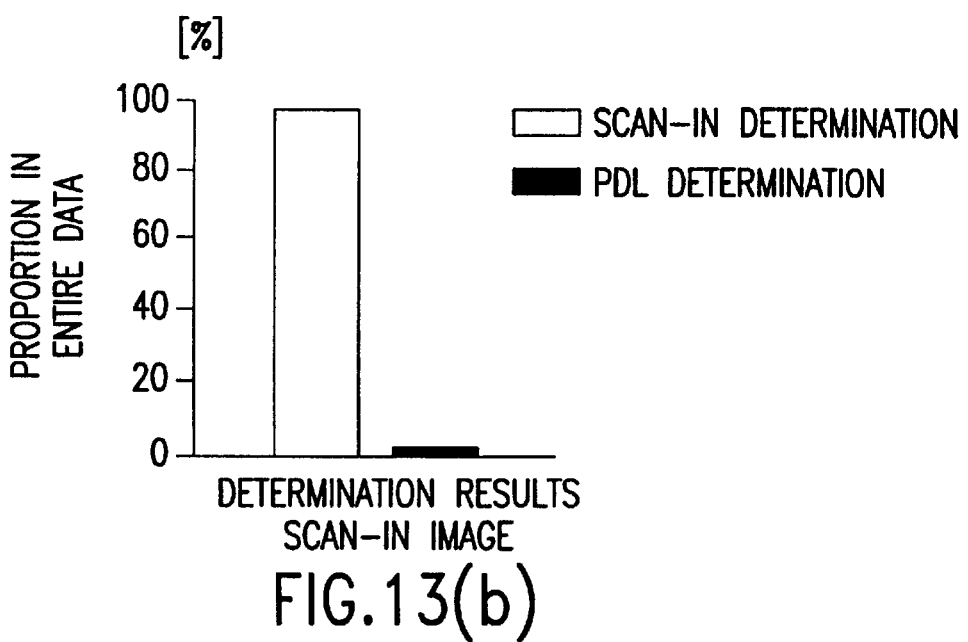
Figure 14:
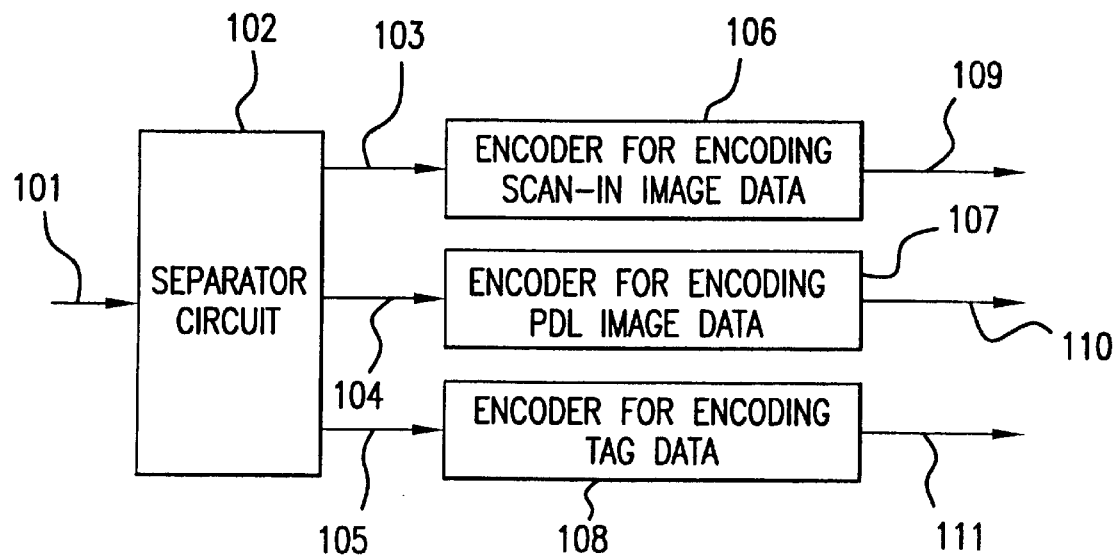
FIG. 14 shows a schematic diagram of an example of an image processing apparatus of a prior art.
Figure 15:
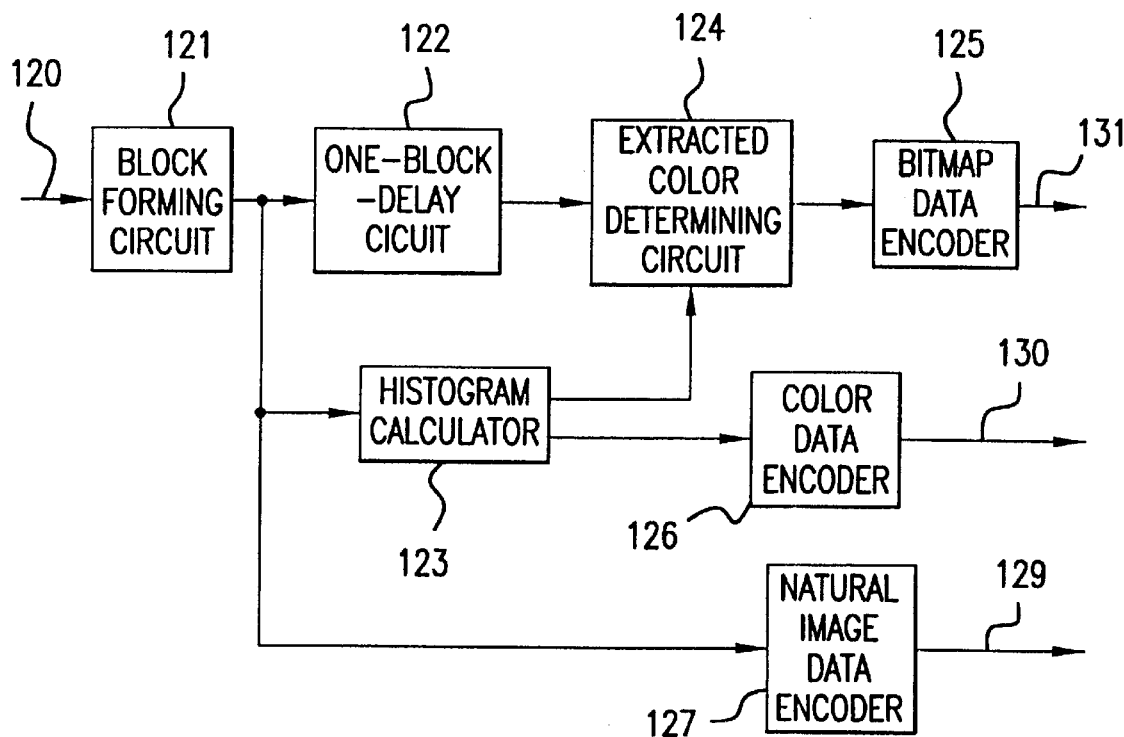
FIG. 15 shows a schematic diagram of another example of the image processing apparatus of the prior art.
Figure 16:
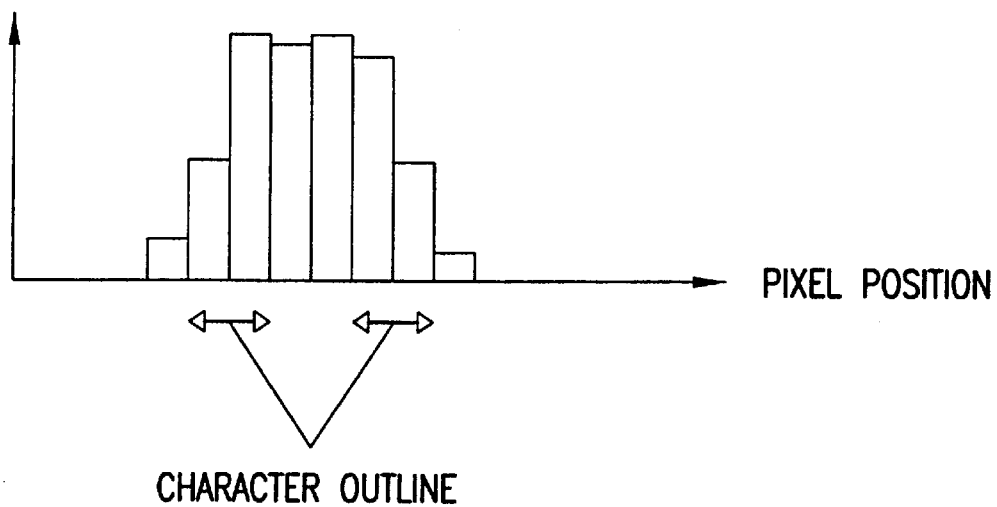
FIG. 16 shows a schematic diagram describing character extraction processing according to the prior art.
Figure 17:
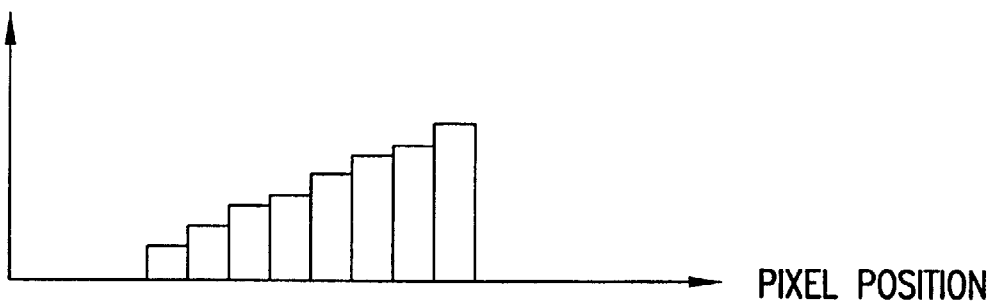
FIG. 17 shows a schematic diagram describing gradation.
Figure 18:
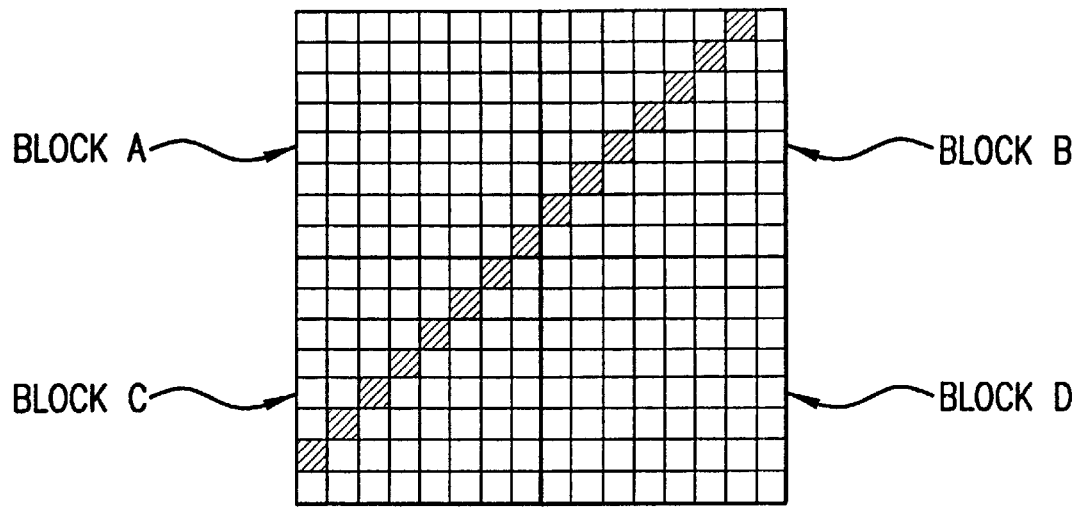
FIG. 18 shows a schematic diagram describing block distortion.
Figure 19:
FIG. 19 shows a schematic diagram describing extraction of outline of a character.

FIGS. 13(a) and 13(b) are results of application to PDL image data and to scan-in image data, respectively. In these figures the horizontal axis indicates the results of determination, and the vertical axis indicates frequency. In PDL image data, it can be seen that almost entire image area is determined to be PDL. Contrary, in scan-in image, it can be seen that almost entire image area is determined to be scan-in image.

As have been described above, according to the present invention, PDL pixel data area having plural color components may be correctly extracted and the image data is prevented from generating any block distortion, by determination on the pixel basis, rather than on the block basis, in the process of determination from input image data such as raster image data, for identifying whether the data is generated by data processing such as PDL image data or is scan-in image data captured optically, for each area in the image data.

As compared to similar process of the prior art, in which computation of the comparison of equation for one pixel of 2016/64=31.5 times and the computation of greater than and smaller than comparison of 63/64 times have been required, the present invention allows the determination to be completed with only eight computations of equation comparison, this leads to significant decrease of computation loads as well as to speed-up of operation.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing apparatus for dividing input image data into scan-in image data and data processing image data, comprising:

a unit for designating a reference area by selecting a pixel of interest having a pixel value and reference pixels surrounding the pixel of interest within the input image data;

a unit for detecting the presence of the reference pixels having the same pixel value with the pixel of interest within the reference area; and a unit for determining image data of the reference area to be the data processing image data generated by data processing if a distribution of the pixel of interest and the reference pixels having substantially the same pixel value with the pixel of interest match one of a plurality of pixel value distributions, and for determining the image data of the reference area to be the scan-in image data if the distribution of the pixel of interest and the reference pixels having substantially the same pixel value with the pixel of interest do not match one of the plurality of pixel value distributions.

2. An image processing apparatus for dividing input image data into scan-in image data and data processing image data, comprising:

a designator for designating a reference area by selecting a pixel of interest having a pixel value and reference pixels surrounding the pixel of interest within the input image data;

a detector for detecting the presence of any of the reference pixels having the same pixel value with the pixel of interest within the reference area; and a determiner for determining image data of the reference area to be the data processing image data generated by data processing if a distribution of the pixel of interest and the reference pixels having the same pixel value with the pixel of interest match one of a plurality of pixel value distributions, and for determining the image data of the reference area to be the scan-in image data if a distribution of the pixel of interest and the reference pixels having the same pixel value with the pixel of interest do not match one of the plurality of pixel value distributions.

3. An image processing apparatus for determining whether input image data contains data processing image data, comprising:

a table for holding a distribution pattern of pixels each of which has substantially the same value with each other for an image data area composed of a plurality of pixels;

a designator for designating a reference area by selecting a pixel of interest having a pixel value and reference pixels surrounding the pixel of interest within the input image data;

a generator for generating a distribution pattern of the pixels within the reference area by comparing the pixel value of the pixel of interest with the pixel values of the reference pixels in the reference area; and a comparator for comparing the generated distribution pattern and a distribution pattern held in said table and for determining image data of the reference area to be the data processing image data generated by data processing if both of the distribution patterns match.

4. The image processing apparatus as set forth in claim 3, wherein said table holds a plurality of distribution patterns of pixels from a different image portion within the data processing image data generated by data processing.

* * * * *